(12) United States Patent
Kayumi et al.

(10) Patent No.: US 7,708,343 B2
(45) Date of Patent: May 4, 2010

(54) SEAT OF VEHICLE

(75) Inventors: Tetsuya Kayumi, Shimotsuke (JP); Sadahiro Yokoyama, Sakura (JP); Kaneaki Hashimoto, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/930,883

(22) Filed: Oct. 31, 2007

(65) Prior Publication Data
US 2008/0136237 A1 Jun. 12, 2008

(30) Foreign Application Priority Data
Dec. 11, 2006 (JP) .............................. 2006-333418

(51) Int. Cl.
*A47C 7/14* (2006.01)
(52) U.S. Cl. .............................. 297/284.9; 297/452.34; 297/452.41
(58) Field of Classification Search ............... 297/284.1, 297/284.3, 284.4, 284.6, 284.8, 284.9, 452.33, 297/452.34, 452.35, 452.36, 452.37
See application file for complete search history.

(56) References Cited

U.S. PATENT DOCUMENTS

| | | | | | |
|---|---|---|---|---|---|
| 4,607,887 | A | * | 8/1986 | Vail | 297/452.26 |
| 4,636,000 | A | * | 1/1987 | Nishino | 297/284.9 |
| 4,885,513 | A | * | 12/1989 | Sakamoto et al. | 297/284.9 |
| 4,965,899 | A | * | 10/1990 | Sekido et al. | 297/284.6 |
| 5,280,997 | A | * | 1/1994 | Andres et al. | 297/284.9 |
| 5,584,532 | A | * | 12/1996 | Marechal | 297/284.1 |
| 5,975,633 | A | * | 11/1999 | Walk et al. | 297/284.9 |
| 6,068,336 | A | * | 5/2000 | Schonauer | 297/284.9 |
| 6,129,419 | A | * | 10/2000 | Neale | 297/284.4 |
| 7,216,934 | B1 | * | 5/2007 | Kobari | 297/284.9 |
| 7,232,174 | B1 | * | 6/2007 | Trott | 296/65.17 |
| 2008/0191533 | A1 | * | 8/2008 | Poniatowski | 297/284.9 |

FOREIGN PATENT DOCUMENTS

| | | | |
|---|---|---|---|
| EP | 343025 A1 | * | 11/1989 |
| JP | 59-118451 | | 8/1984 |
| JP | S60-152352 | | 10/1985 |
| JP | 61-27483 | | 8/1986 |
| JP | 61-163546 | | 10/1986 |
| JP | 3-8118 | | 2/1991 |
| JP | 3-16452 | | 2/1991 |
| JP | H5-17958 | | 5/1993 |

* cited by examiner

*Primary Examiner*—David Dunn
*Assistant Examiner*—Patrick Lynch
(74) *Attorney, Agent, or Firm*—Rankin, Hill & Clark LLP (57) ABSTRACT

This seat of a vehicle is provided with: a center supporting block having a first supporting surface for supporting an occupant; side supporting blocks that are arranged at both sides in the width of the center supporting block, and having a second supporting surface that more protrude than the first supporting surface of the center supporting block; movable supporting blocks each arranged between the center supporting block and the side supporting blocks, and each having a third supporting surface which is flush with the first supporting surface while in an initial state; joining portions each joining between the side supporting blocks and the movable supporting block; and expanding devices that are arranged at a back side of the side supporting blocks, expand the side supporting blocks, and incline the movable supporting blocks with respect to the first supporting surface of the center supporting block.

11 Claims, 8 Drawing Sheets

SEAT OF VEHICLE

Priority is claimed on Japanese Patent Application No. 2006-333418, filed Dec. 11, 2006, the contents of which are incorporated herein by reference.

BACKGROUND OF THE INVENTION

1. Field of the Invention

The present invention relates to a seat of a vehicle that can change the shapes and the attitudes thereof in accordance with the physique of an occupant.

2. Description of the Related Art

A conventional seat of a vehicle is proposed which is provided with a seatback and a seat cushion each having side supporting blocks for supporting the sides of an occupant (for example, Japanese Examined Utility Model Application, Second Publication No. H03-8118).

This seat of a vehicle is provided with the side supporting blocks that protrude more forward than a supporting surface of a center supporting block that supports the occupant, at both sides of the center supporting block. These side supporting blocks support the sides of the shoulders, the hip, the thighs, and the like, of the occupant. Each of the side supporting blocks contains a bag at thereinside that can change the volume thereof. The protruding amounts of skins of the side supporting blocks are adjusted by adjusting the volumes of the bags.

However, in this conventional seat of a vehicle which expands the side supporting blocks by the bags, when the bags are expanded, the skins of the side supporting blocks approach toward the occupant while forming curved surfaces, and the expanded portions make line contacts with the body of the occupant. Therefore, there was a possibility of causing the uncomfortableness to the occupant.

In addition, in this conventional seat of a vehicle, it has been difficult to sufficiently fit the side supporting blocks to the occupant whose body sizes such as the shoulder width or the like is comparatively narrow. On the other hand, in this conventional seat of a vehicle, there has been a possibility of causing the uncomfortableness to the occupant due to excessive restriction from the sides to the occupant whose body size comparatively wide.

The present invention was made in view of the above-mentioned circumstances, and has an object of providing a seat of a vehicle that can reliably hold occupants each having different physiques with each other, without causing the uncomfortableness.

SUMMARY OF THE INVENTION

In order to achieve the above-mentioned object, the present invention has employed the following:

(1) A seat of a vehicle of the present invention is provided with: a center supporting block having a first supporting surface for supporting an occupant; side supporting blocks that are arranged at both sides in the width of the center supporting block, and having a second supporting surface that more protrude than the first supporting surface of the center supporting block; movable supporting blocks each arranged between the center supporting block and the side supporting blocks, and each having a third supporting surface which is flush with the first supporting surface while in an initial state; joining portions each joining between the side supporting blocks and the movable supporting block; and expanding devices that are arranged at a back side of the side supporting blocks, expand the side supporting blocks, and incline the movable supporting blocks with respect to the first supporting surface of the center supporting block.

According to the seat of a vehicle, while in the initial state where the expanding devices are not in operation, the second supporting surfaces of the movable supporting blocks become flush with the first supporting surface of the center supporting block, and the amount of protrusions of the side supporting blocks is small. In this initial state, only the side supporting blocks restrict from the both sides the movement of the occupant having a relatively larger physique. In addition, from this state, when the expanding devices are operated to protrude the side supporting blocks forward with respect to the first supporting surface, the movable supporting blocks will incline via the joining portions, and the third supporting surfaces of the movable supporting blocks will have a inclination angle with respect to the first supporting surface of the center supporting block. In this state, the third supporting surfaces of the inclined movable supporting blocks will fit to the occupant having a relatively smaller physique, and thereby restricting the movement of the occupant in the side direction, together with the side supporting blocks.

Accordingly, while in the initial state where the expanding device is not in operation, the third supporting surfaces of the movable supporting blocks are maintained so as to be substantially flush with the first supporting surface of the center supporting block; therefore, it is possible to restrict the occupant having the relatively larger physique, from the both sides by the side supporting blocks, without causing the uncomfortableness to the occupant. Furthermore, when the expanding devices are operated from this state, the side supporting blocks will protrude and the third supporting surfaces of the movable supporting blocks will incline via the joining portions; therefore, the protruded side supporting blocks and the inclined movable supporting blocks can fittingly restrict from the both sides the occupant having the relatively smaller physique, without causing the uncomfortableness to the occupant due to applying excessive pressure or the like.

(2) The seat of a vehicle according to the above (1) may be further provided with supporting plates that are arranged between the expanding devices and the side supporting blocks, and contact both of the side supporting blocks and the movable supporting blocks.

In this case, when the expanding devices are operated, the expanding devices will apply the pressure via the supporting plates onto the side supporting blocks and the movable supporting blocks. With this operation, the side supporting blocks and the movable supporting blocks will move smoothly and continuously.

Accordingly, the pressing force from the expanding devices can be applied through the supporting plates onto the side supporting blocks and the movable supporting blocks in parallel manner. Therefore, the side supporting blocks and the movable supporting blocks can move smoothly and continuously while driving the expanding devices. Accordingly, the adjustment of the seat of a vehicle can be stably performed.

(3) The seat of a vehicle according to the above (1) may be further provided with fixing portions that join between the movable supporting blocks and the center supporting block at a near of the first supporting surface of the center supporting block and the third supporting surfaces of the movable supporting blocks.

In this case, the inclination angles of the movable supporting blocks centering on the fixing portions can be changed while suppressing the movement of the first supporting surface of the center supporting block.

Accordingly, since the inclination angles of the movable supporting blocks centering on the fixing portions can be changed without moving the first supporting surface of the center supporting block, the adjustment of the seat of a vehicle can be stably performed without causing the uncomfortableness to the occupant due to the movement of the first supporting surface of the center supporting block.

(4) Another seat of a vehicle of the present invention is provided with: a center supporting block having a first supporting surface for supporting an occupant; side supporting blocks that are movably arranged at both sides in the width of the center supporting block, and having a second supporting surface that more protrude than the first supporting surface of the center supporting block; and expanding devices that are arranged at a back side of the side supporting blocks, and move the side supporting blocks toward an inside in the width of the center supporting block.

According to the seat of a vehicle, while in an initial state where the expanding devices are not in operation, the amount of protrusions toward the inside in the width of the both side supporting blocks is the minimum. In this state, both of the side supporting blocks which are opened so as to have the maximum opening width will restrict the movement of the occupant having the relatively larger physique, from the both sides. Furthermore, when the expanding devices are operated from this state, the side supporting blocks will move to the inside in the width while maintaining the inclination angles of the side supporting blocks on the occupant-restriction side to the substantially constant angle, and thereby restricting the movement of the occupant from the both sides.

Accordingly, while in the initial state where the expanding devices are not in operation, the amount of protrusions toward the inside in the width of the both side supporting blocks is the minimum; therefore, it is possible to restrict the occupant having the relatively larger physique, from the both sides by the side supporting blocks, without causing the uncomfortableness to the occupant. On the other hand, when the expanding devices are operated, the side supporting blocks will protrude toward the inside in the width while maintaining the inclination angles of the side supporting blocks on the occupant-restricting side to be substantially constant, and thereby enabling fittingly restricting the sides of the occupant having relatively smaller physique, without causing the uncomfortableness to the occupant due to applying excessive pressure or the like.

(5) The seat of a vehicle according to the above (4) may be further provided with elastic members that are extendable and connect between the side supporting blocks and a seat frame member.

In this case, when the expanding devices are operated, the side supporting blocks on the both sides will move toward the inside in the width while extending the elastic members. When the amounts of protrusions of the expanding devices are reduced from this state, shrinking forces of the elastic members will be applied to the both side supporting blocks, and thereby the side supporting blocks will be returned to the initial position.

Accordingly, the elastic members joining between the side supporting blocks and the seat frame member will permit the flexible movements of the side supporting blocks. And furthermore, the elastic members enable the side supporting blocks to easily return to the initial position.

(6) Another seat of a vehicle of the present invention is provided with: a center supporting block having a first supporting surface for supporting an occupant; side supporting blocks each having a second supporting surface that more protrudes than the first supporting surface of the center supporting block; and expandable bags each being airtight and provided at back sides of the side supporting blocks, wherein a total width of the first supporting surface of the center supporting block is adjusted by supplying a gas to the expandable bags to move the side supporting blocks.

(7) The seat of a vehicle according to the above (6) may be arranged such that each of the side supporting blocks includes: an upper side-supporting block that supports a shoulder of the occupant; and a lower side-supporting block that supports a hip of the occupant.

(8) The seat of a vehicle according to the above (7) may be further provided with: movable supporting blocks each arranged between the center supporting block and the upper side-supporting blocks, and each having a second supporting surface that is flush with the first supporting surface of the center supporting block while in an initial state; and expanding devices that move the upper supporting blocks and incline the movable supporting blocks with respect to the first supporting surface of the center supporting block by supplying the gas to the expandable bags.

(9) The seat of a vehicle according to the above (8) may be further provided with supporting plates each arranged between the expanding devices and the side supporting blocks, and contacts both of the side supporting blocks and the movable supporting blocks.

(10) The seat of a vehicle according to the above (8) may be further provided with fixing portions that join between the movable supporting blocks and the center supporting block at a near of the first supporting surface of the center supporting block and the second supporting surface of the movable supporting blocks.

(11) The seat of a vehicle according to the above (7) may be arranged such that: the lower side-supporting blocks are movably provided to the center supporting block; and the lower side-supporting blocks move toward an inside in the width of the center supporting block by supplying the gas to the expandable bags.

(12) The seat of a vehicle according to the above (11) may be further provided with elastic members that are extendable and connect between the side supporting blocks and a seat frame member.

DETAILED DESCRIPTION OF THE INVENTION

Embodiments of the present invention will be described below with reference to the drawings. In the following explanation, the forward, backward, upward, and downward mean those of a vehicle, if it is especially not specified.

A First Embodiment

A seat of a vehicle 1 of the present embodiment is a separated type seat on the driver's seat side or on the assistant driver's seat side.

Figure 1:
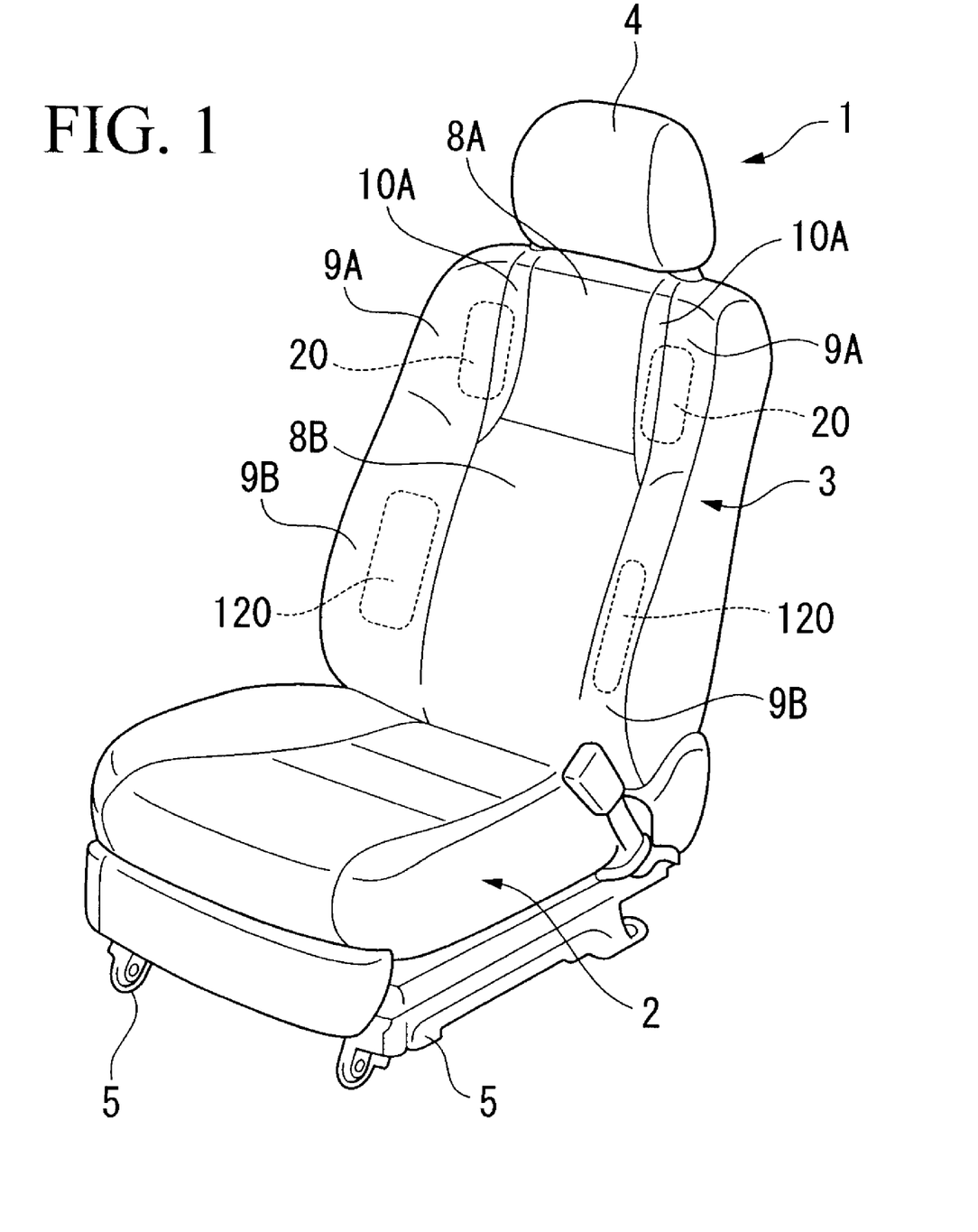
FIG. 1 is a perspective view of a seat of a vehicle according to a first embodiment of the present invention.

As shown in FIG. 1, a seat of a vehicle 1 is provided with a seat cushion 2 that supports from the hip to the thigh of an occupant, a seatback 3 that supports from the shoulder to the waist of the occupant, and a headrest 4 that supports the head of the occupant. The seat cushion 2 is installed in a vehicle body via seat rails 5 so as to be movable along the vehicle length. A lower end of the seatback 3 is joined with a back end of the seat cushion 2 via a hinge. The headrest 4 is attached to a top end of the seatback 3 such that the vertical position thereof is adjustable.

Figure 2:
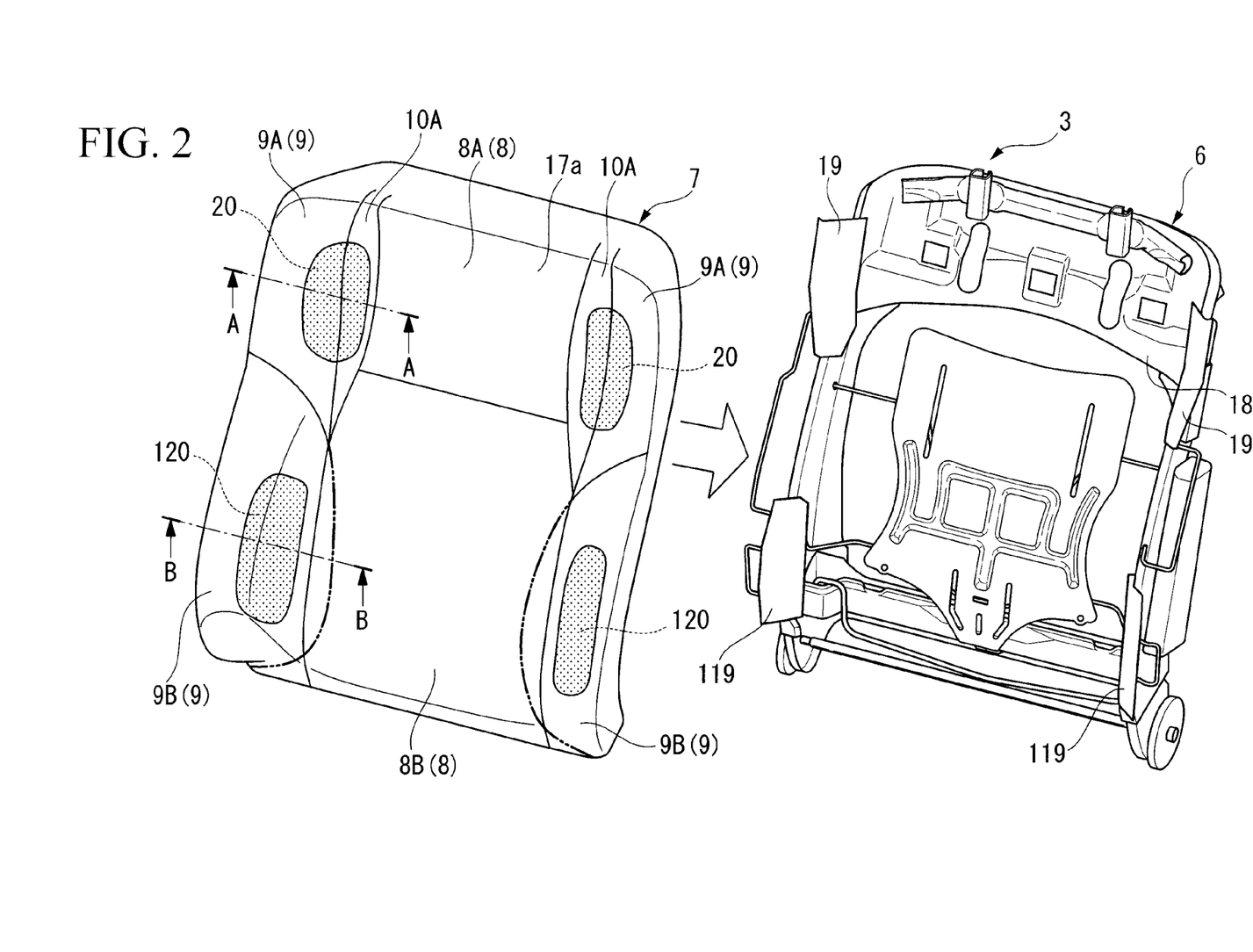
FIG. 2 is an exploded perspective view of a seatback of the seat of a vehicle.

As shown in FIG. 2, the seatback 3 is provided with a substantially rectangular-shaped frame unit 6 including a metal frame panel 18 and spring members, and a cushion unit 7 that is attached to the front of the frame unit 6. The cushion unit 7 includes a plurality of blocks each having different functions. That is, the cushion unit 7 is divided into: an upper region arranged on the upside and having the height of one third of the total length of the cushion unit 7; and a lower region arranged below the upper region. Each of the upper region and the lower region includes a center supporting block 8 on a substantial center in the width of the cushion unit 7, and a side supporting block 9 on the both sides of the center supporting block 8. Moreover, in the following explanation, each block between the upper region and the lower region is distinguished by adding "A" or "B" next to the reference symbols thereof.

Figure 3:
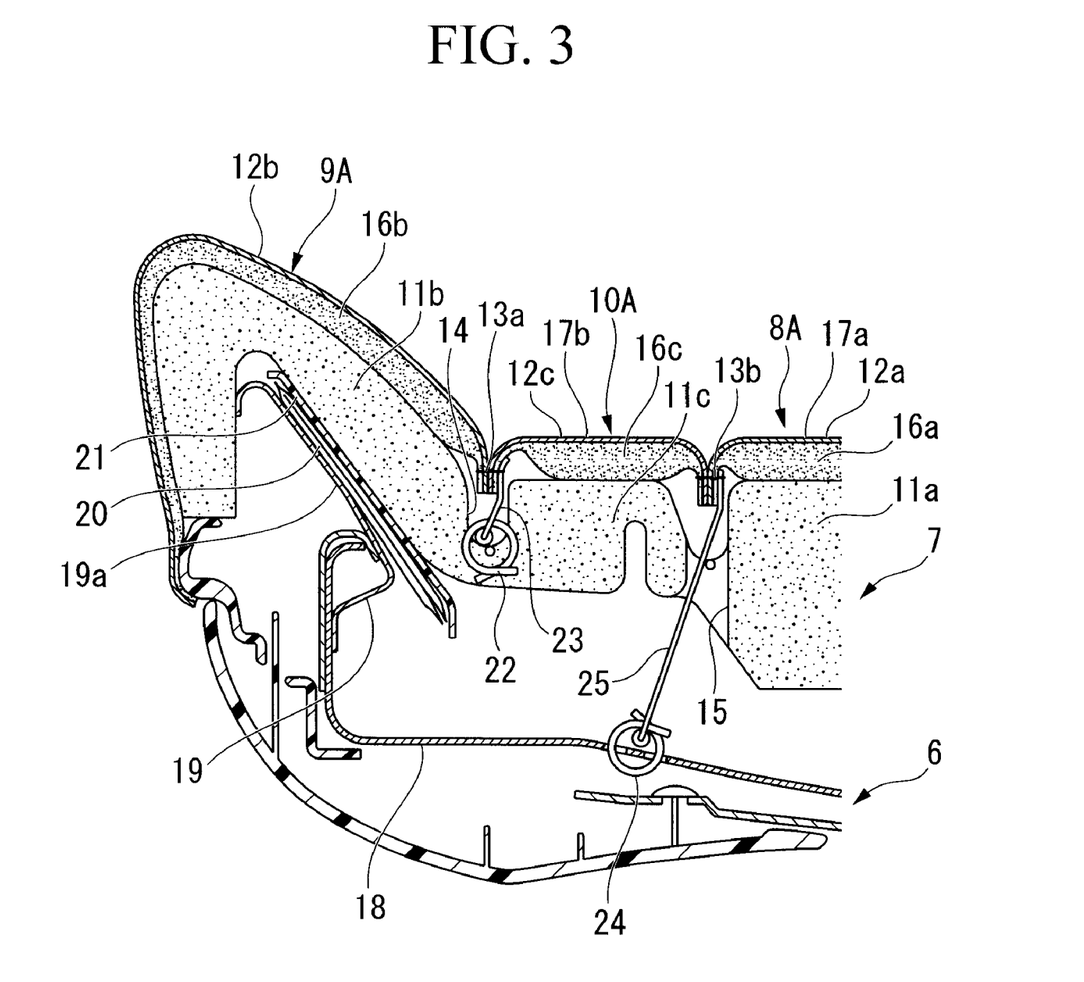
FIG. 3 is a cross-sectional view of the seat of a vehicle, taking along a line A-A of FIG. 2.
Figure 4:
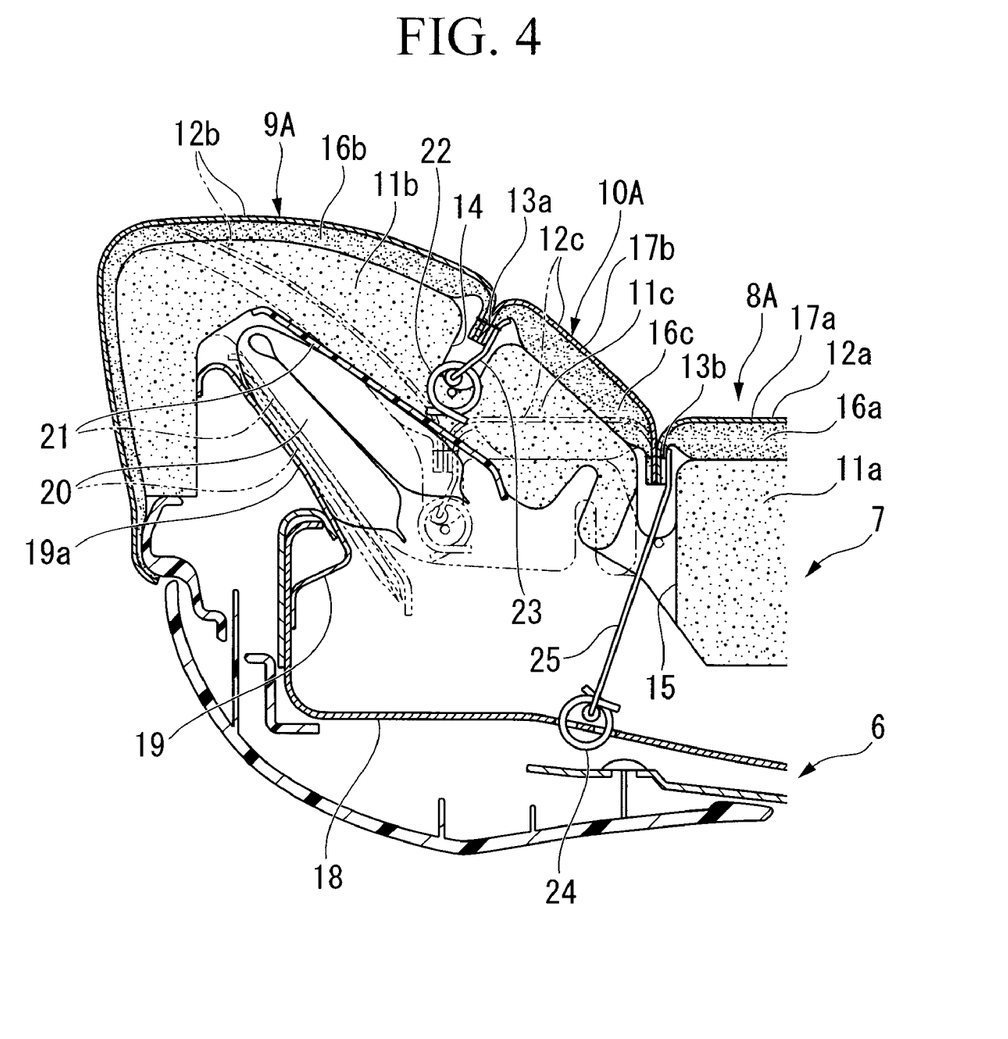
FIG. 4 is a cross-sectional view of the seat of a vehicle, taking along the line A-A of FIG. 2.

As shown in FIGS. 3 and 4, the upper region of the seatback 3 includes a center supporting block 8A that supports the back from the shoulders to the neck of the occupant, and side supporting blocks 9A that are arranged on the both sides of the center supporting block 8A and support the sides of the shoulders of the occupant. Movable supporting blocks 10A are each provided between the center supporting block 8A and the side supporting blocks 9A so as to be movable back and forth along the thickness of the seatback 3 (i.e., movable in the vertical direction in relation to a supporting surface 17a). The side supporting blocks 9A protrude forward with respect to the supporting surface 17a of the center supporting block 8A in order to support the shoulders of the occupant from sides thereof. The protruded portions are formed so that the protruding amount increases in accordance with approaching to the outsides thereof in the width of the vehicle.

The center supporting block 8A includes a thick cushion body 11a and a skin 12a covering a surface of the cushion body 11a; each of the side supporting blocks 9A includes a thick cushion body 11b and a skin 12b covering a surface of the cushion body 11b; and each of the movable supporting blocks 10A includes a thick cushion body 11c and a skin 12c covering a surface of the cushion body 11c. The center supporting block 8A, the side supporting blocks 9A, and the movable supporting block 10A are joined with each other via sutured portions 13a and 13b (joining portion) between the skins 12a, 12b, and 12c. Moreover, in the present embodiment, each of the cushion bodies 11a, 11b, and 11c has different reference symbols for clear explanations; however, in actually, the cushion bodies 11a, 11b, and 11c are formed in one unit body, and each of them is independently movable by grooves 14 and slits 15 formed therein. In addition, a cushion layer 16a made of a material harder than those of the cushion bodies 11a to 11c is unitarily attached to a back face of the skin 12a; a cushion layer 16b made of a material harder than those of the cushion bodies 11a to 11c is unitarily attached to a back face of the skin 12; and a cushion layer 16c made of a material harder than those of the cushion bodies 11a to 11c is unitarily attached to a back face of the skin 12c.

As also shown in FIG. 2, metal supporting brackets 19 are attached to the both sides of the frame panel 18 on the upper side of the frame unit 6, in order to support the back face side of the side supporting blocks 9A. Each of the supporting brackets 19 includes a flat supporting wall 19a that inclines rearward from the outside to the inside in the width of the vehicular seat 1 (i.e., inclines downward in the paper of FIGS. 3 and 4), and one face of a bag 20 folded in two is attached to the supporting wall 19a. Another face of the bag 20 is attached to a deformable resin-made supporting plate 21. This supporting plate 21 is arranged so as to contact both back faces of the side supporting blocks 9A and the movable supporting block 10A (i.e., the cushion bodies 11b and 11c). That is, the supporting plate 21 strides over the connection between the back faces of the side supporting blocks 9A and the movable supporting block 10A.

By supplying air from the outside to the bags 20, the entirety of each bag 20 expands as shown in FIG. 4. In accordance with the expansion, the bags 20 move the side supporting blocks 9A and the movable supporting blocks 10A joined thereto, in the forward, via the supporting plates 21. In the present embodiment, the bags 20 constitute an expanding device (volume changeable device).

The sutured portion 13a joining portion) between the skin 12b of the side supporting block 9A and the skin 12c of the movable supporting block 10A, are connected via a connecting band 23 to a fixed ring 22 arranged at the deep inside in the groove 14 between the cushion body 11a of the side supporting block 9A and the cushion body 11a of the movable supporting block 10A. Furthermore, the sutured portion 13b (fixing portion) between the skin 12c of the movable supporting block 10A and the skin 12a of the center supporting block 8A, are connected via a connecting band 25 to a fixed ring 24 that is fixed to the frame panel 18. Therefore, the joining portion (the sutured portion 13b) between the center supporting block 8A and the movable supporting block 10A is pulled by the connecting band 25, and thereby maintaining the constant height (i.e., the constant thickness) of the movable supporting block 10A even when the bag 20 pushes the movable supporting block 10A. Accordingly, when the movable supporting block 10A is pushed by the bag 20, only the side of the movable supporting block 10A, where is joined with the side supporting block 9A is raised. As the result, the inclination angle of the movable supporting block 10A with respect to the supporting surface 17a will increase. Moreover, while in an initial state where the volume of the bag 20 is not expanded, as shown in FIG. 3, the movable supporting block 10A is arranged such that the supporting surface 17b thereof becomes substantially flush with the supporting surface 17a of the center supporting block 8A.

Figure 5:
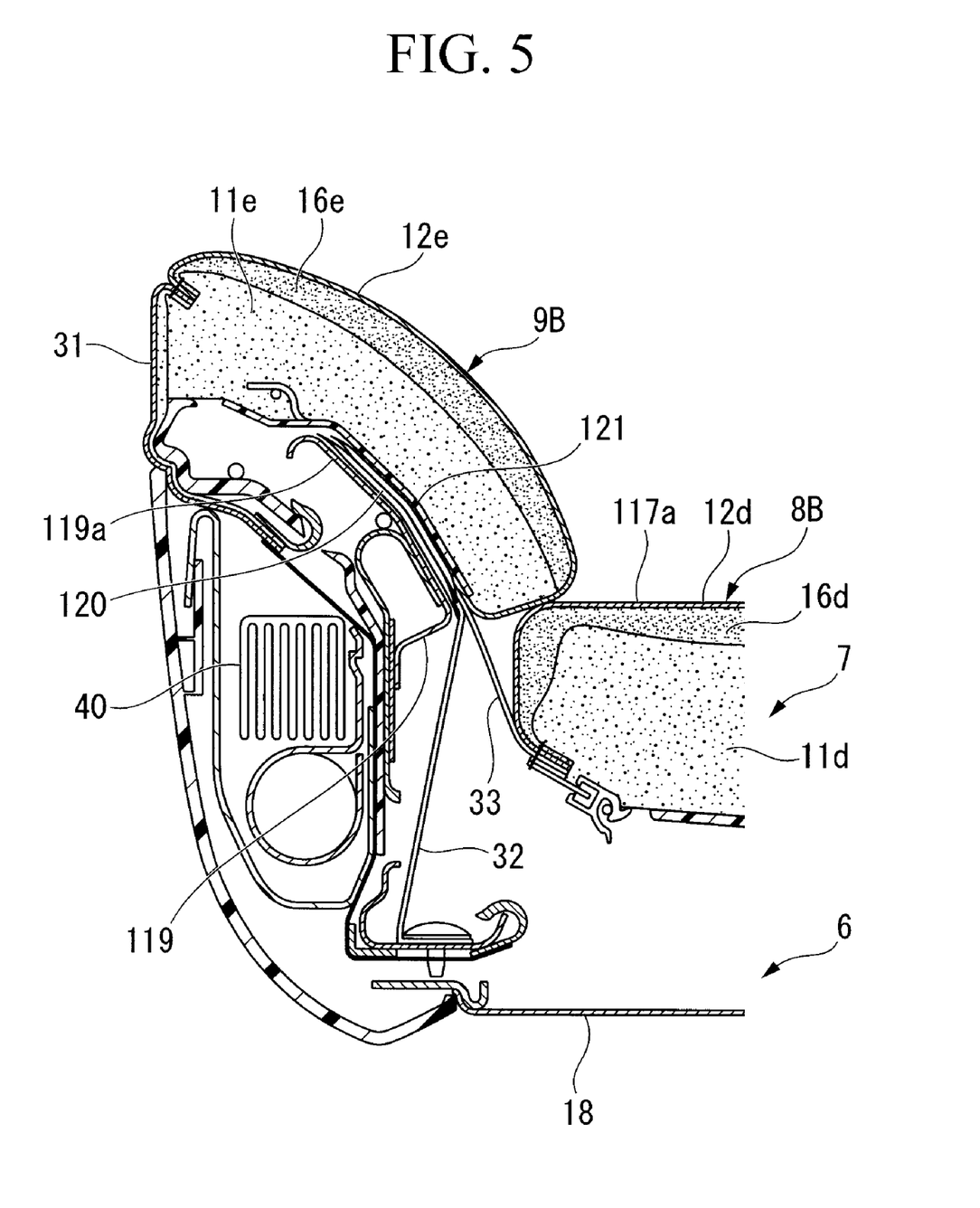
FIG. 5 is a cross-sectional view of the seat of a vehicle, taking along a line B-B of FIG. 2.
Figure 7:
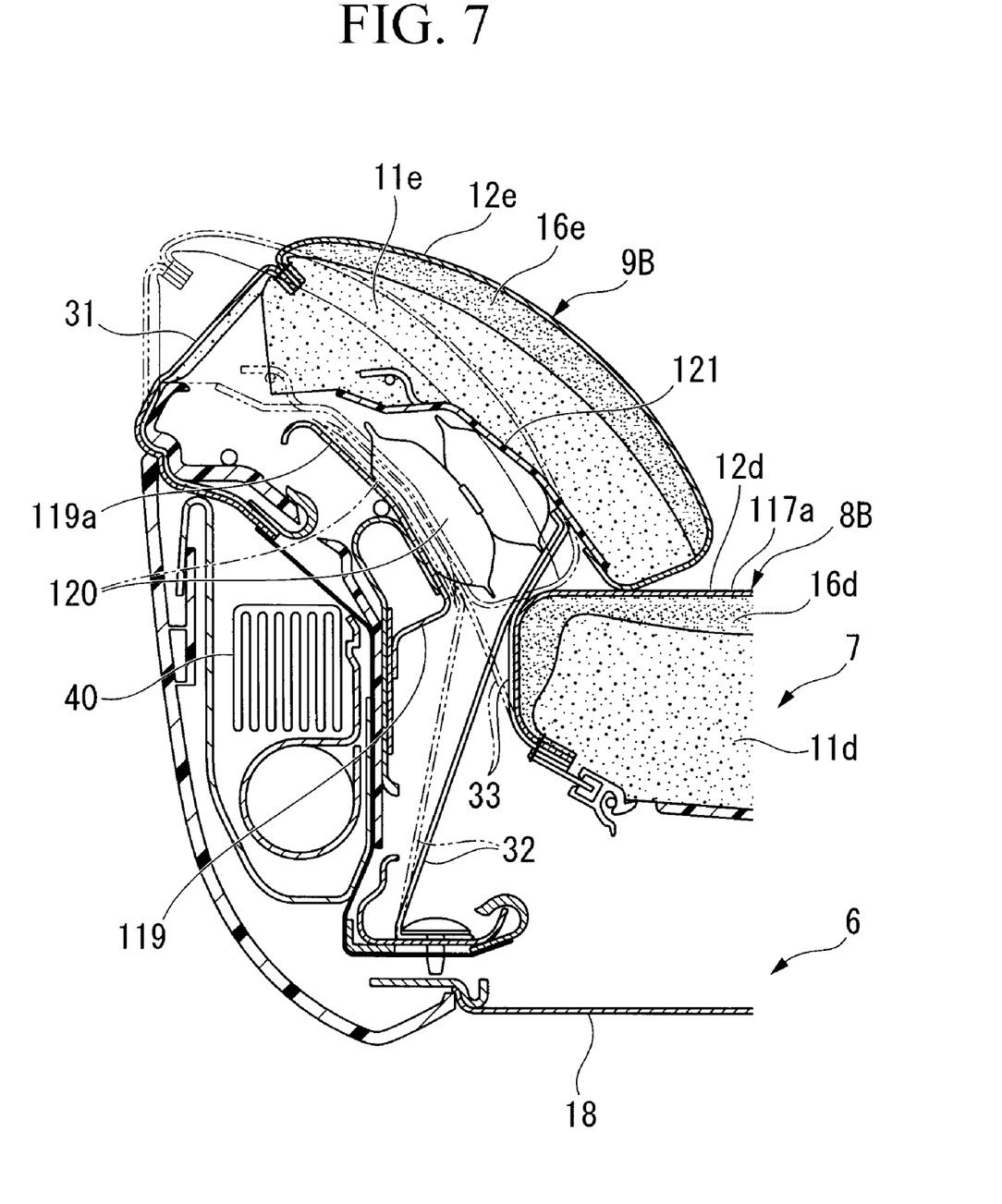
FIG. 7 is a cross-sectional view of the seat of a vehicle, taking along the line B-B of FIG. 2.

On the other hand, as shown in FIGS. 5 and 7, the lower region of the seatback 3 includes a center supporting block 8B that supports the back from the underarm to the hip of the occupant, and a side supporting blocks 9B arranged at the sides of the center supporting block 8B and support the sides from the underarm to the hip of the occupant. Since the side supporting block 9B supports the side from the underarm to the hip of the occupant, the side supporting block 9B protrudes forward in relation to a supporting surface 117a of the center supporting block 8B. Also in this side supporting block 9B, it is formed such that the protruding amount thereof increases in accordance with approaching to the outside in the width of the vehicle.

Figure 6:
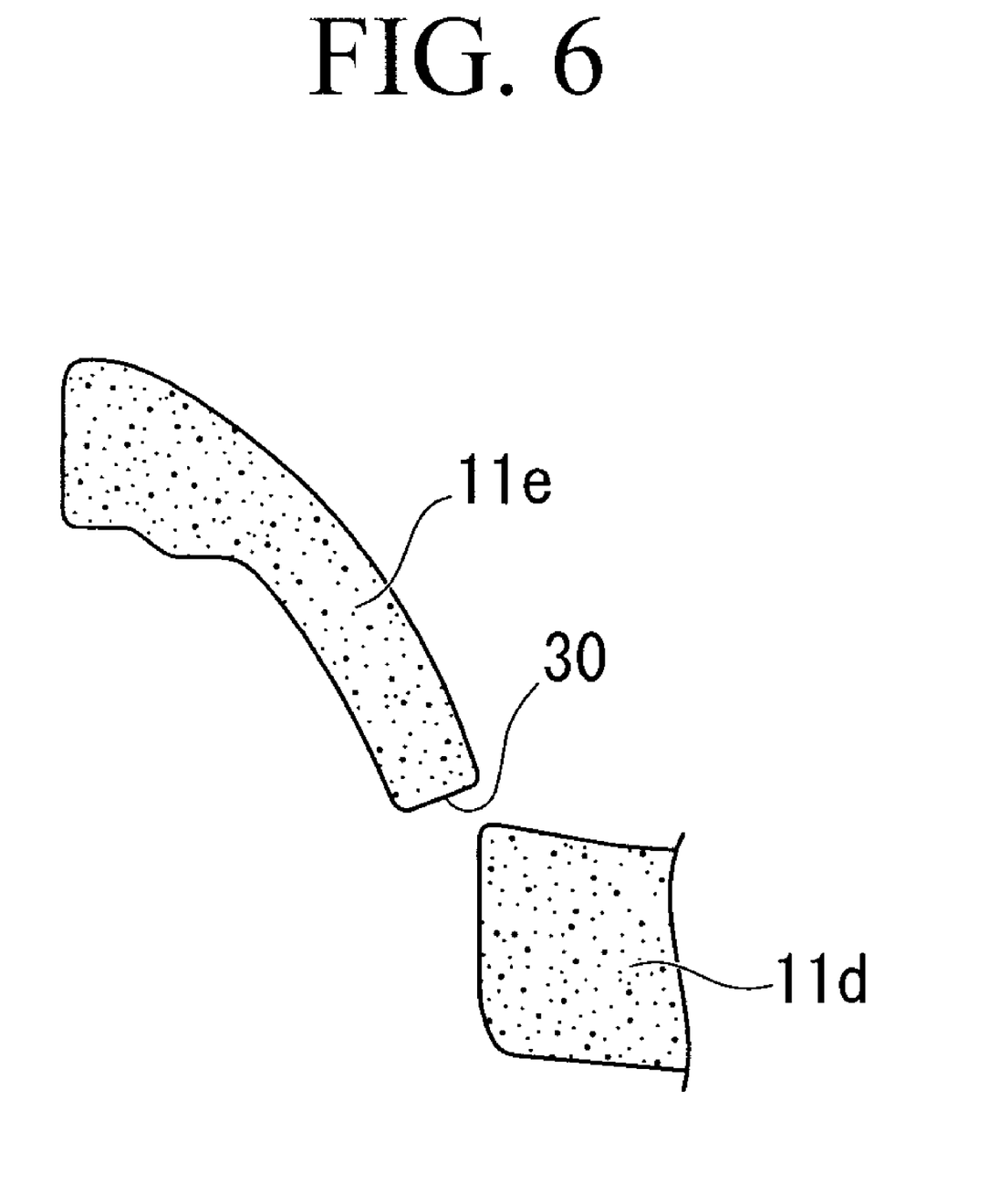
FIG. 6 is a cross-sectional view showing an image of a cushion pad of the seat of a vehicle.

The center supporting block 8B in the lower region includes a thick cushion body 11d covered with a skin 12d to which a cushion layer 16d is attached; and the side supporting block 9B in the lower region includes a thick cushion body 11e covered with a skin 12e to which a cushion layer 16e is attached. In addition, as shown in FIG. 6, a slit 30 that extends along the height of the seat of a vehicle 1 is formed between the cushion body 11d of the center supporting block 8B and the cushion body 11e of the side supporting block 9B. With this slit 30, both of the center supporting block 8B and the side supporting block 9B can independently move forwards and backwards. At the portion around the slit 30, the skins 12d and 12e reach to and cover the backside of the cushion body 11d of the center supporting block 8B and the cushion body 11e of the side supporting block 9B.

As also shown in FIG. 2, metal supporting brackets 119 are attached to the both sides of the frame panel 18 on the lower side of the frame unit 6. Each of the supporting brackets 119 includes a flat supporting wall 119a that inclines rearward from the outside to the inside in the width of the vehicular seat 1, and one face of a bag 120 folded in two is attached to the supporting wall 119a. A deformable resin-made supporting plate 121 that supports the back face of the cushion body 11e of the side supporting block 9B is attached to the bag 20.

The bag 120 constitutes an expanding device (volume expandable device). By supplying air from the outside to the bag 120, the entire of the bag 120 expands as shown in FIG. 7, and pushes the back face of the side supporting block 9B.

The skin 31 provided on the outside in the width of the side supporting block 9B is formed by an extendable elastic member, and an end thereof is joined with the frame panel 18 of the frame unit 6. A sheet member 32 made of an extendable elastic material is attached to the near of a corner of the backside on the inside in the width of the side supporting block 9B. An end of the sheet member 32 is joined with the frame panel 18. Therefore, both of the outside and the inside in the width of the side supporting block 9B are extendably engaged with the frame panel 18 via the skin 31 and the sheet member 32. When the side supporting block 9B receives the pressure from the bag 120 through the supporting plate 121, as shown in FIG. 7, the applied pressure will push and move the side supporting block 9B toward the inclining direction (i.e., toward the inside in the width and the forward of the seat for a vehicle 1) while extending the skin 31 and the sheet member 32. At this time, an inside end in the width of the side supporting block 9B rides over the supporting surface 117a of the center supporting block 8B, and protrudes to the inside in the width of the supporting surface 117a while sliding thereon. In addition, one end of a sheet member 33 for preventing insertion of the fingers is attached to the near of a corner on the backside and the inside in the width of the side supporting block 9B.

Moreover, the reference symbol 40 in FIGS. 5 and 7 denotes a side airbag installed in the side of the seat for a vehicle 1.

According to the seat for a vehicle 1 having the above-mentioned construction, in order to fit the seatback 3 to the occupant having the relatively larger physique, air is not supplied to the bags 20 and 120 in the upper region and the lower region of the seatback 3, and thereby maintaining the seatback 3 to the initial state shown in FIGS. 3 and 5.

At this time, the side supporting blocks 9A in the upper region do not expand in the forward, and the movable supporting blocks 10A therefore do not have an inclination angle with respect to the supporting surfaces 17a of the center supporting block 8A. Therefore, at this time, the supporting surfaces 17b of the movable supporting blocks 10A arranged between the center supporting block 8A and the side supporting blocks 9A become substantially flush with the supporting surface 17a of the center supporting block 8A. As a result, the back of the occupant having the relatively larger physique is supported by both of the supporting surfaces 17a and 17b, while the sides of the shoulders of the occupant are held by the side supporting blocks 9A.

The side supporting blocks 9B in the lower region are not pushed by the bags 120, and therefore do not protrude to the inside in the width. Therefore, the opening width between the side supporting blocks 9B on the both sides is maintained to be the maximum dimension, and the side supporting blocks 9B thereby hold from the underarm to the hip of the occupant having the relatively larger physique.

On the other hand, in order to fit the seatback 3 to the occupant having the relatively smaller physique, air is supplied to the bags 20 and 120 in the upper region and the lower region of the seatback 3, and thereby expanding the bags 20 and 120 as shown in FIGS. 4 and 7.

At this time, in the upper region, the bags 20 push forward the back faces of the side supporting blocks 9A and the movable supporting blocks 10A via the supporting plates 21. As a result, the side supporting blocks 9A protrude forward, and the outer ends in the width of the movable supporting blocks 10A are raised. Therefore, the supporting surfaces 17b of the movable supporting blocks 10A form an inclination angle with respect to the supporting surface 17a of the center supporting block 8A. Accordingly, the supporting surfaces 17b of the movable supporting blocks 10A will incline toward the sides of the shoulders of the occupant having comparatively small physique, and the back of the occupant will be supported by the center supporting block 8A while the sides of the shoulders will be fittingly held by the movable supporting blocks 10A and the side supporting blocks 9A.

On the other hand, in the lower region, the bags 120 push forward the back faces of the side supporting blocks 9B via the supporting plates 121. As a result, the side supporting blocks 9B ride on the supporting surface 117a of the center supporting block 8B, and move to protrude toward the inside of in the width. At this time, the skin 31 and the sheet member 32 joining the side supporting blocks 9B to the frame panel 18 will be extended; therefore, the side supporting blocks 9B smoothly protrude and move toward the inside in the width. Therefore, from the underarm to the hip of the occupant having the relatively smaller physique is fittingly supported by the side supporting blocks 9B.

As has been explained in the above, the upper region of the seat of a vehicle 1 is provided with the movable supporting blocks 10A arranged between the side supporting blocks 9A and the center supporting block 8A, and the inclination angles of the skin 12c (supporting surface) of the movable supporting block 10A is changeable in accordance with the physique of the occupant. Therefore, it is possible to stably hold the shoulders of any occupants having different physiques, without causing uncomfortableness to the occupant such as an excessive pressure.

In addition, in the lower region, the side supporting blocks 9B move to protrude toward the inside in the width without largely changing the inclination angles of the supporting surfaces of the side supporting blocks 9B; therefore, it is possible to stably support from the underarm to the hip of any occupants having different physiques without causing uncomfortableness to the occupants.

The deformable supporting plate 21 is sandwiched between the bag 20 and the cushion bodies 11b and 11c in the upper region, while the deformable supporting plate 121 is sandwiched between the bag 120 and the cushion body 11e in the lower region. Therefore, since the cushion bodies 11b, 11c, and 11e do not partially protrude when the volumes of the bags 20 and 120 are expanded, it is possible to prevent uncomfortableness due to applying the excessive pressure or the like onto the occupant.

In addition, the bag 20 in the upper region transfers its pushing force onto both of the supporting blocks 9A and 10A in a parallel manner via the supporting plate 21 that strides over the side supporting blocks 9A and the movable supporting block 10A; therefore, it is possible to smoothly perform both of the protruding motion of the side supporting blocks 9A and the inclining motion of the movable supporting block 10A, without applying a load onto the joining portion therebetween. Accordingly, the adjustment operation of the seat for a vehicle 1 can be performed stably, and the durability of the device will be increased.

Furthermore, in the present embodiment, the side supporting blocks 9B in the lower region are joined with the frame panel 18 via the elastic skin 31 and sheet member 32; therefore, smooth protruding motions of the side supporting blocks 9B can be performed, and the side supporting blocks 9B can be easily returned to the initial position thereof using the elasticity of the skins 31 and the sheet members 32.

Moreover, the present invention is not only limited to the above, and the modifications can be applied without departing from the spirit or scope of the present invention. For example, in the present embodiment, the features of the present invention are applied onto the seatback; however, the same construction may be applied to the seat cushion.

Second Embodiment

Figure 8:
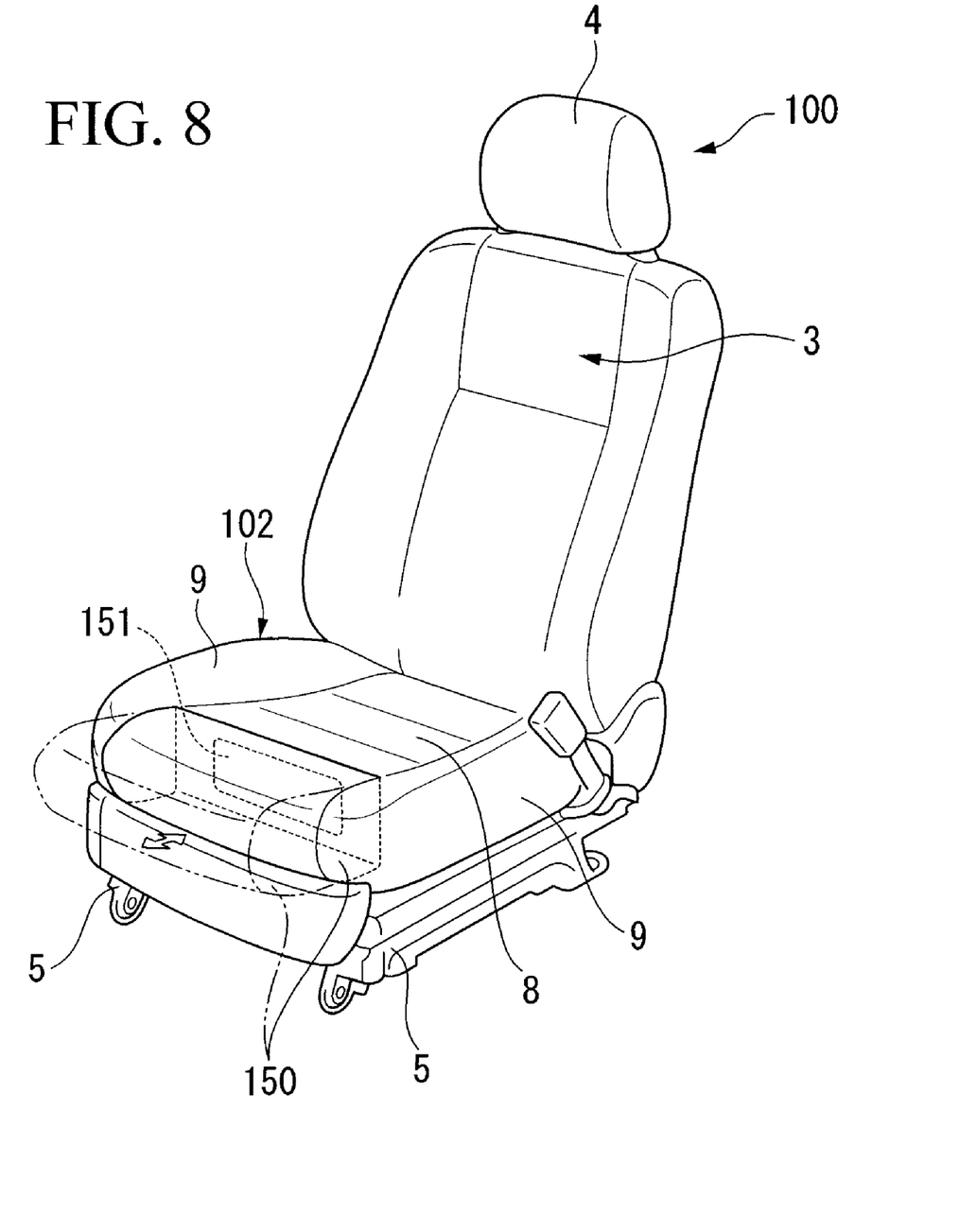
FIG. 8 is a perspective view of a seat of a vehicle according to a second embodiment of the present invention.

Next, a seat of a vehicle according to a second embodiment of the present embodiment will be explained below with reference to FIG. 8. Moreover, in the following explanation, the differences with respect to the first embodiment will be mainly explained, and the explanations for the others are omitted here since they are the same as those of the first embodiment.

A seat of a vehicle 100 of the present invention is provided with a deformable cushion pad 150 that can change the length thereof, on a front end of the seat cushion 102, in addition to the bags 20 for holding the shoulders and the bags 120 for holding the hip.

This deformable cushion pad 150 is provided to the seat cushion 102 so as to be slidable in the length of the vehicle, and is movable in the forward and backward by expanding and shrinking a bag 151 arranged between the seat cushion 102 and the deformable cushion pad 150. Moreover, it may be arranged such that: non-illustrated occupant-detection sensor such as a weight sensor or a sitting height sensor is provided in the seat of a vehicle 100; and the bags 20, 120, and 150 are controlled based on the estimated physique data measured by the sensors. In this case, the occupant firstly switches on a non-illustrated switch or the like, and the physique of the occupant is classified to one among the plurality of physique data based on the data obtained by the weight sensor and the seat height sensor. The physique data is desirable to be obtained in advance as a map of the seat height and the weight. Next, the bags 20, 120, and 151 are expanded or shrink so as to have a set pressure which was set in advance, and thereby changing the seat shape so as to fit to the classified physique data. By employing this construction, even when the occupants having different physiques use the same vehicle, the seat shape can be changed so as to fit with the every occupant with only one switching operation. In addition, in this case, the seat shape is desirable to be memorized in a memory. In this case, the desirable seat shape can be obtained in a short time.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A seat of a vehicle, comprising:
 a center supporting block having a first supporting surface for supporting an occupant;
 a plurality of side supporting blocks, each side supporting block being arranged at a side of the center supporting block in a width direction of the center supporting block, each side supporting block having a second supporting surface that protrudes relatively further than the first supporting surface of the center supporting block, each side supporting block including an upper side-supporting block for supporting a shoulder of the occupant and a lower side-supporting block for supporting a hip of the occupant;
 a plurality of movable supporting blocks, each of the movable supporting blocks being arranged between the center supporting block and one of the upper side supporting blocks, each movable supporting block having a third supporting surface that is flush with the first supporting surface while in an initial state;
 a plurality of joining portions, each of the joining portions joining one of the side supporting blocks to one of the movable supporting blocks; and
 expanding devices that are arranged at a back side of the side supporting blocks, expand the side supporting blocks, and incline the movable supporting blocks with respect to the first supporting surface of the center supporting block.

2. The seat of a vehicle according to claim 1, further comprising
 supporting plates that are arranged between the expanding devices and the side supporting blocks, and contact the side supporting blocks and the movable supporting blocks.

3. The seat of a vehicle according to claim 1, further comprising
 fixing portions that join the movable supporting blocks and the center supporting block at a location near a junction of the first supporting surface of the center supporting block and the third supporting surfaces of the movable supporting blocks.

4. A seat of a vehicle, comprising:
 a center supporting block having a first supporting surface for supporting an occupant;
 a plurality of side supporting blocks, each side supporting block being arranged at a side of the center supporting block in a width direction of the center supporting block, and each side supporting block having a second supporting surface that protrudes relatively further than the first supporting surface of the center supporting block, each side supporting block including an upper side-supporting block for supporting a shoulder of the occupant and a lower side-supporting block for supporting a hip of the occupant;

a plurality of movable supporting blocks, each of the movable supporting blocks being arranged between the center supporting block and one of the upper side supporting blocks, each movable supporting block having a third supporting surface that is flush with the first supporting surface while in an initial state;

lower expanding devices that are arranged at a back side of the side supporting blocks, and move the side supporting blocks toward an inside in the width of the center supporting block, and upper expanding devices that are arranged at the back side of the side supporting blocks, and incline the movable supporting blocks with respect to the first supporting surface of the center supporting block.

5. The seat of a vehicle according to claim 4, further comprising elastic members that are extendable and connect between the side supporting blocks and a seat frame member.

6. A seat of a vehicle, comprising:

a center supporting block having a first supporting surface for supporting an occupant;

a plurality of side supporting blocks, each side supporting block having a second supporting surface that protrudes relatively further than the first supporting surface of the center supporting block, each side supporting block including an upper side-supporting block for supporting a shoulder of the occupant and a lower side-supporting block for supporting a hip of the occupant;

a plurality of movable supporting blocks, each of the movable supporting blocks being arranged between the center supporting block and one of the upper side supporting blocks, each movable supporting block having a third supporting surface that is flush with the first supporting surface while in an initial state; and expandable bags each being airtight and provided at back sides of the side supporting blocks, wherein a total width of the first supporting surface of the center supporting block is adjusted by supplying a gas to the expandable bags to move the side supporting blocks, and wherein the expandable bags incline the movable supporting blocks with respect to the first supporting surface of the center supporting block.

7. The seat of a vehicle according to claim 6, further comprising:

expanding devices that move the upper supporting blocks and incline the movable supporting blocks with respect to the first supporting surface of the center supporting block by supplying the gas to the expandable bags.

8. The seat of a vehicle according to claim 7, further comprising supporting plates each arranged between the expanding devices and the side supporting blocks, and contact the side supporting blocks and the movable supporting blocks.

9. The seat of a vehicle according to claim 7, further comprising fixing portions that join the movable supporting blocks and the center supporting block at a location near a junction of the first supporting surface of the center supporting block and the third supporting surface of the movable supporting blocks.

10. The seat of a vehicle according to claim 6, wherein:

the lower side-supporting blocks are movably provided to the center supporting block; and the lower side-supporting blocks move toward an inside in the width of the center supporting block by supplying the gas to the expandable bags.

11. The seat of a vehicle according to claim 10, further comprising elastic members that are extendable and connect between the side supporting blocks and a seat frame member.

* * * * *